(12) United States Patent
Ashkenazi

(10) Patent No.: US 6,803,697 B1
(45) Date of Patent: Oct. 12, 2004

(54) HEAT INJECTED MAGNETICALLY BALANCED ENGINE

(76) Inventor: Brian I. Ashkenazi, 10430 Wilshire Blvd. Unit 306, Los Angeles, CA (US) 90024

( * ) Notice: Subject to any disclaimer, the term of this patent is extended or adjusted under 35 U.S.C. 154(b) by 101 days.

(21) Appl. No.: 10/177,935

(22) Filed: Jun. 18, 2002

Related U.S. Application Data
(60) Provisional application No. 60/299,358, filed on Jun. 19, 2001.

(51) Int. Cl.[7] .................. F25B 21/02; H02K 57/00; H02K 1/22
(52) U.S. Cl. ........................................ 310/306; 318/117
(58) Field of Search ........................... 310/306; 318/117

(56) References Cited

U.S. PATENT DOCUMENTS

| | | |
|---|---|---|
| 4,634,343 A | 1/1987 | Nakamats |
| 5,059,876 A | 10/1991 | Shah |
| 5,637,936 A | 6/1997 | Meador |
| 5,714,829 A | 2/1998 | Guruprasad |
| 5,942,806 A | 8/1999 | Veliadis |
| 6,307,142 B1 | 10/2001 | Allen et al. |

FOREIGN PATENT DOCUMENTS

| | | | | |
|---|---|---|---|---|
| IT | 378881 | * | 2/1940 | .................. 310/306 |
| IT | 403291 | * | 4/1943 | .................. 310/306 |

* cited by examiner

*Primary Examiner*—Thanh Lam
*Assistant Examiner*—David W. Scheuermann
(74) *Attorney, Agent, or Firm*—Blakely Sokoloff Taylor & Zafman, LLP

(57) ABSTRACT

Heat energy is converted into mechanical energy through the mobilization of electrical charges within a thermoelectric material. A plurality of plugs of thermoelectric material are mounted on a rotor. Heat energy is directed to one end of each of the plugs. The heat energy mobilizes free charges in the plugs which collect at the relatively cooler end, thereby electrically polarizing the plugs. A pulsed electromagnetic force field acts upon the polarized plugs to exert a torque on the rotor.

18 Claims, 4 Drawing Sheets

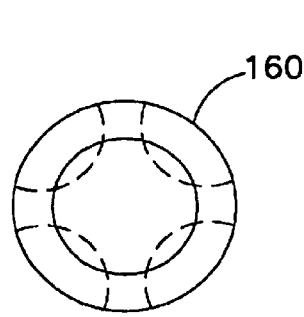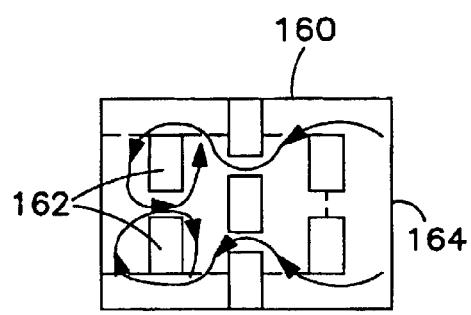
FIG. 7A  FIG. 7B
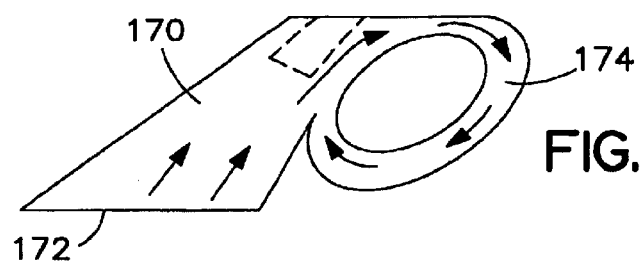
FIG. 8
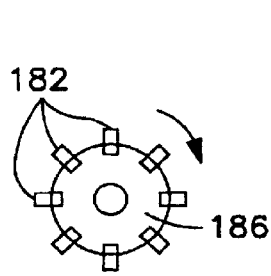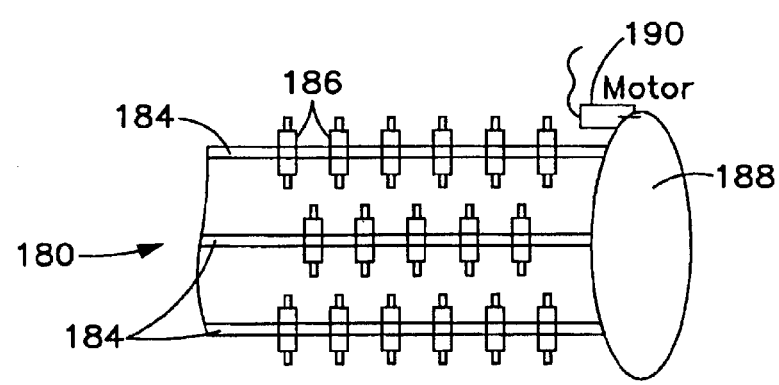
FIG. 9B
FIG. 9A

HEAT INJECTED MAGNETICALLY BALANCED ENGINE

RELATED APPLICATION

This application claims the benefit of provisional application Ser. No. 60/299,358 filed Jun. 19, 2001.

BACKGROUND OF THE INVENTION

1. Field of the Invention

The present invention relates generally to the field of prime movers. More specifically, the invention relates to an engine that converts heat energy to mechanical motion through the mobilization of electrical charges within a pulsed electromagnetic force field.

2. Background

Numerous technologies are available for converting heat energy into mechanical motion. The operating principles of the steam engine were demonstrated in ancient Greece. In 1821, the Seebeck effect was discovered, wherein an electrical current flows between junctions of dissimilar materials maintained at different temperatures. Thermoelectric devices utilizing the Seebeck effect are capable of converting heat energy into useful amounts of electrical energy. The electrical energy, in turn, may be converted to mechanical energy by means of a conventional electrical motor.

SUMMARY OF THE INVENTION

The present invention comprises a novel method for converting heat energy into mechanical energy through the mobilization of electrical charges within a thermoelectric material. The mobilized charges create a voltage differential within the thermoelectric material. A pulsed electromagnetic force field exerts a force on the polarized thermoelectric material, which is harnessed as mechanical energy. In one embodiment of the invention, a plurality of plugs of thermoelectric material are mounted on a rotor. Heat energy is directed to one end of each of the plugs, thereby electrically polarizing the plugs. A pulsed electromagnetic force field acts upon the polarized plugs to exert a torque on the rotor.

BRIEF DESCRIPTION OF THE DRAWINGS

FIGS. 7A, 7B illustrate another plug design.

FIG. 8 illustrates yet another plug design.

FIGS. 9A, 9B illustrate an engine constructed in accordance with another embodiment of the present invention.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1A:
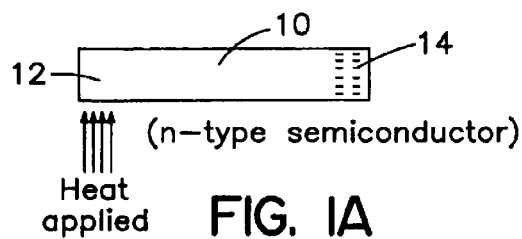
FIG. 1A illustrates a first type of thermoelectric material that may be utilized in the present invention.
Figure 1B:
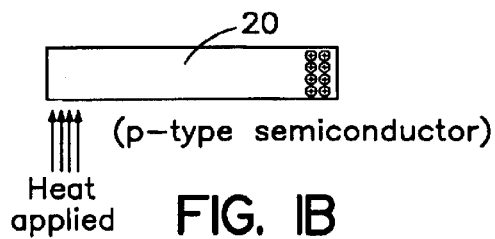
FIG. 1B illustrates a second type of thermoelectric material that may be utilized in the present invention.

An engine constructed in accordance with the present invention utilizes a plug of a thermoelectric material such as shown in FIG. 1A. When heat is applied to end 12 of plug 10, free electrical charges within the material flow towards and collect at the opposite end 14 of the plug. A plug made of an n-type semiconductor material is shown in FIG. 1A. Such a material is rich in free electrons—on the order, for example, of $10^{19}/cm^3$. A plug 20 of a p-type semiconductor material is shown in FIG. 1B. The operating principle is identical, except that the material has a surplus of free positive charges.

When a thermoelectric plug such as shown in either of FIGS. 1A or 1B is placed within an electromagnetic force field, a force is exerted on the plug, the direction of the force depending upon the respective polarities of the plug and the force field. The engine of the present invention harnesses this force in the form of mechanical energy.

Figure 2:
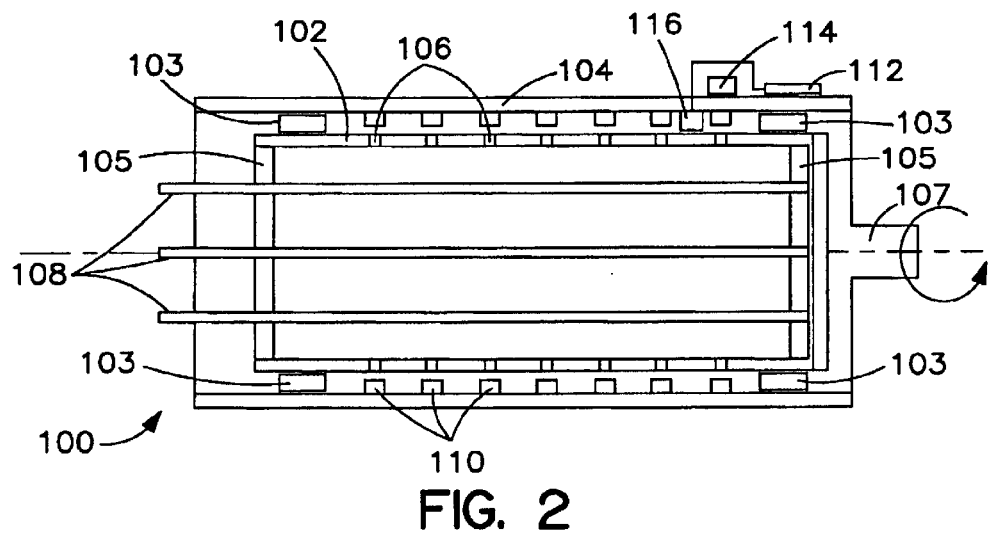
FIG. 2 is a cross-sectional view of an engine constructed in accordance with one embodiment of the present invention.

FIG. 2 is a cross-sectional view of an engine 100 that operates on the above-described principles. A rotor assembly 102 is mounted on bearings 103 within a stationary housing 104. A plurality of plugs 106 of thermoelectric material are installed in the rotor assembly. As explained above, each of plugs 106 is made of a suitable thermoelectric material, such as highly doped n-type or p-type semiconductor material or other similar material with an abundance of free electrical charges. The plugs are heated from within the rotor assembly by heater rods 108. A temperature controller (not shown) regulates the amount of heat transmitted by rods 108 so that plugs 106 are maintained at their optimum working temperature. Any source of heat energy may be employed. For example, heater rods 108 may be connected to a solar collector. Alternatively, heat may be supplied from combustion of conventional fuels, from geothermal sources or from chemical or nuclear reactions. The source of heat may be waste heat from industrial processes that would otherwise be released into the environment. The ends of the rotor assembly are sealed by caps 105. Mechanical energy is transmitted from engine 100 via shaft 107.

Electromagnets 110 are disposed on the housing 104. The electromagnets are energized by control module 112, which receives electrical power from battery 114. Control module 112 energizes the electromagnets to generate a cyclical or pulsed electromagnetic field. Thus, the control module functions as a commutator to pulse the electromagnetic field so that the forces exerted on the plugs of thermoelectric material produce continuous rotation of the rotor 102. Sensor 116 is coupled to control module 112. Sensor 116 senses the rotational position of rotor assembly 102 and may also sense the rotational velocity. The electromagnets 110 are pulsed in synchronism with rotation of the rotor assembly. The pulse frequency is also a function of the angular spacing of the plugs and electromagnets.

Figure 3:
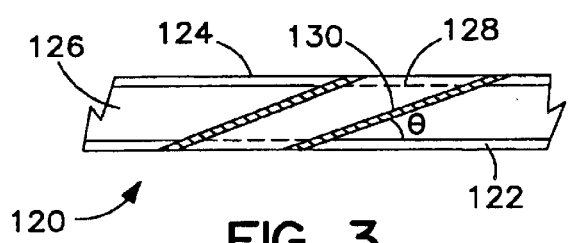
FIG. 3 is a detailed view illustrating a plug receptacle in the rotor of an engine.

Referring to FIG. 3, the rotor assembly 102 has an outer shell 120 comprising an inner structural skin 122, an outer structural skin 124 and a structural foam core 126. Such construction provides a high strength rotor that is low in cost and light in weight. The inner and outer skins may be made of a filament-wound, fiber reinforced composite material. Rotor shell 120 is fabricated with a plurality of slots or cutouts 128 to receive the plugs of thermoelectric material. Slots 128 are oriented at an angle θ with respect to the circumference of rotor shell 120. The value of the angle θ is dependent on the characteristics of the thermoelectric material used for plugs 106, the characteristics of the electromagnetic field generated by electromagnets 110 and the design rotational speed of rotor assembly 102. A magnetically shielded insert 130 with internal threads is bonded into each of the slots 128.

Figure 4:
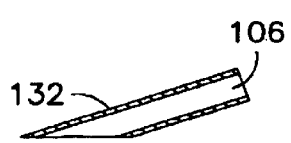
FIG. 4 is a detailed view of a plug assembly for installation in the receptacle of FIG. 3.

Referring next to FIG. 4, each of the plugs 106 is bonded into a high temperature plastic insert 132 with external threads. The assembly of plug 106 and insert 132 is then screwed into insert 130 in the rotor wall. A spring lock mechanism (not shown) may be applied to each of the plug assemblies to prevent loosening of the threads during operation. Alternatively, the mating threads may be formed with an interference fit or other mechanical or chemical locking means may be employed.

Housing 104 may be made of a fiber reinforced composite material as in the case of rotor shell 120. The housing may be fabricated in two halves to ease assembly and may be perforated with cooling vents to aid in cooling the outer skin of rotor shell 120. As mentioned above, electromagnets 110 are secured to the inner surface of housing 104. The electromagnets are arranged in an appropriate pattern to complement the arrangement of plugs 106.

As described above, electromagnets 110 are energized by control module 112 which receives electrical power from battery 114. To conserve battery power, coils of conductive wire may be embedded in the outer skin 124 of rotor shell 120. As the rotor assembly rotates, current is induced in the coils by the electromagnetic field generated by electromagnets 110. This current may be used to power control module 112 so that current from battery 114 is required only during startup.

Figure 5:
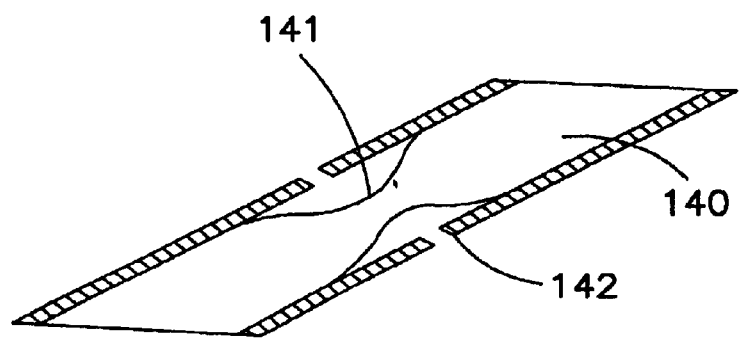
FIG. 5 is a detailed view illustrating an alternative plug design.

An alternative design for a plug 140 is illustrated in FIG. 5. This plug is generally in the shape of an hourglass and is heated from both inside and outside the rotor shell. Charges collect at the narrowed center portion 141 of the plug, thereby effectively doubling the number of plugs. Air passages are designed into the rotor shell and insert 142. Cooling air is routed through the rotor wall to cool the center portions of the plugs so as to maintain the necessary temperature differential for charge collection.

Figure 6:
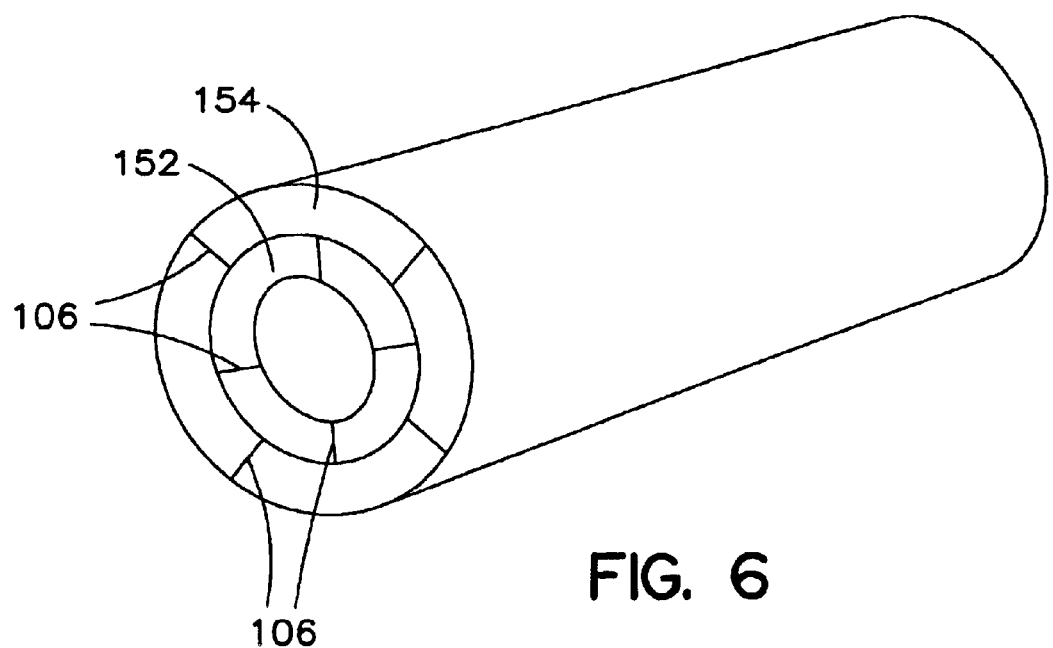
FIG. 6 illustrates an engine in accordance with an embodiment of the present invention using a multilevel rotor.

FIG. 6 illustrates an alternate rotor design with multiple concentric levels. Plugs 106 (or plugs 140) are installed in annular walls 152 and 154, thereby increasing the number of plugs in the engine and significantly increasing the output power.

FIGS. 7A, 7B illustrate another alternative plug design. Plug 160 is configured with a plurality of slots or cutouts 162. By virtue of these cutouts, the application of heat at end 164 of the plug creates a continuous flow of current as indicated by the arrows in the figure.

Another alternative plug design is shown in FIG. 8. Plug 170 has a generally "P"-shaped design. Heat applied to surface 172 causes free charges in the material to migrate toward the top. Interaction with the electromagnetic field directs the charges around the loop 174 and a continuous flow of current is established. In this design, as well as in the design of FIGS. 7A, 7B, the current flow within the plugs increases the interaction with the electromagnetic field and thereby increases the torque on the rotor.

The quantity of free charges in the plugs may be enhanced by fabricating on the plugs 160 and/or 170 additional layered construction. Using a chemical vapor deposition (CVD) or similar process, plugs 160 and/or 170 may be upgraded with several alternating layers of insulator and doped silicon or other suitable material deposited or attached in rings or bands at the top and/or side cavities of the plugs. Forces of repulsion by and between the mobilized charges in the main body of the plug and the charges in the rings or bands will free the charges in the silicon layers. The electromagnetic field will cause the free charges to flow continuously in each layer around the rings or bands, thereby enhancing the quantity of free charges contained in each plug.

FIGS. 9A, 9B illustrate a further enhancement of the subject invention. The power output of the engine may be increased by applying a pulsed magnetic field using permanent magnets in addition to the pulsed electromagnetic field generated by the electromagnets. This will minimize electricity requirements. An assembly 180 of permanent magnets 182 is arranged around the engine rotor. Assembly 180 comprises a plurality of rods 184. Each of the rods carries a plurality of rollers 186 on which permanent magnets 182 are mounted. Each of the rods is connected at one end of the engine housing to a drive mechanism 188, which is driven by motor 190. Each of the rods is rotated to thereby generate pulsed magnetic fields in the vicinity of each of the rollers.

Figure 10:
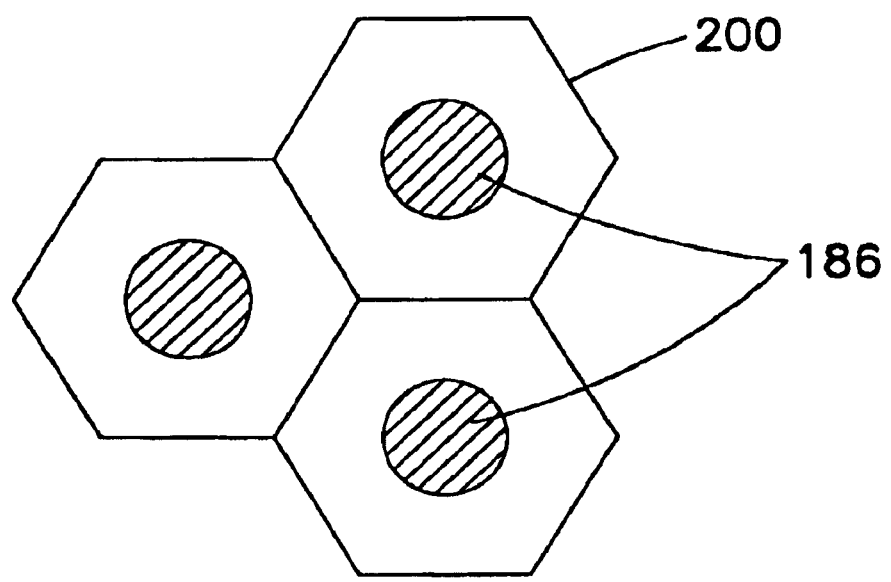
FIG. 10 illustrates magnetic shielding of the magnets to enhance engine performance.

Referring to FIG. 10, an additional enhancement includes an open ended honeycomb-like grid 200, made from magnetic shielding sheeting material, that is attached to the inside of housing 104. Each opening of the grid compartmentalizes a single magnet location. The magnetic shield fences and concentrates the magnetic field applied to each zone on the rotor. The shield also protects the rotor zone by minimizing magnetic interference or eddying from/by adjacent zones, thus providing maximum magnetic force field to the charges in each plug.

The principle of operation of the subject invention has been tested using a commercially available polysilicon rod. The rod was suspended for rotation about its lengthwise center. Heat was applied to one end of the rod with a candle and a permanent magnet was positioned in proximity to the opposite end of the rod. The rod was observed to rotate away from its equilibrium position. The rod returned to its equilibrium position only if either the magnet or candle were withdrawn.

Among the advantageous features of an engine constructed in accordance with the present invention are the following:
1. Lightweight and compact.
2. Very few internal moving parts.
3. Easily adaptable to different sizes/outputs, whereby the total number of plugs determine the engine output.
4. Engine working temperature determined by plug material used.
5. Solid state design of adding layers of insulation and thermoelectric material on plug enhances number of charges in plug.
6. Lower working temperatures compared to other heat cycle engines, e.g. heat discharged from air conditioning unit could be used on engine coupled to blower for energy savings.
7. Magnetic shielding around magnets enhances field effect on plugs and engine performance.
8. Additional pulsed light introduced between magnets and plugs will enhance output/performance.
9. Mechanical energy and electrical power produced in a single unit, rather than having a separate driving unit coupled to a generator.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An engine comprising:
   means for generating a cyclical electromagnetic field;
   a rotating assembly having a rotor and a plurality of discrete thermoelectric plugs carried by the rotor and disposed within the cyclical electromagnetic field;
   means for applying heat to the thermoelectric plugs;
   wherein the thermoelectric plugs are oriented in the rotating assembly such that electrical charges mobilized by application of heat interact with the cyclical electromagnetic field to exert a torque on the rotating assembly.

2. The engine of claim 1 wherein the means for generating a cyclical electromagnetic field comprises a plurality of electromagnets disposed on a stationary assembly surrounding the rotating assembly.

3. The engine of claim 2 further comprising a pulse generator coupled to the plurality of electromagnets and wherein the cyclical electromagnetic field comprises a pulsed electromagnetic field.

4. The engine of claim 3 further comprising a sensor sensing a position of the rotating assembly and coupled to the pulse generator to generate the pulsed electromagnetic field in synchronism with rotation of the rotating assembly.

5. The engine of claim 1 wherein at least some of the thermoelectric plugs comprise n-type semiconductor material.

6. The engine of claim 1 wherein at least some of the thermoelectric plugs comprise p-type semiconductor material.

7. The engine of claim 1 wherein the means for applying heat to the thermoelectric plugs applies heat from inside the rotating assembly.

8. The engine of claim 1 wherein the means for applying heat to the thermoelectric plugs applies heat to a first end of each of the thermoelectric plugs.

9. The engine of claim 1 wherein the means for applying heat to the thermoelectric plugs applies heat to first and second ends of the thermoelectric plugs.

10. The motor of claim 1 wherein each of the thermoelectric plugs comprises a closed loop of material for containing a continuous circuitous flow of electrical charges.

11. The engine of claim 1 further comprising means for generating a cyclical magnetic field.

12. The engine of claim 1 further comprising means disposed in the rotating assembly for generating an electrical current induced by the cyclical electromagnetic field.

13. The engine of claim 12 further comprising a pulse generator coupled to the means for generating a cyclical electromagnetic field and wherein the pulse generator is powered by the electrical current.

14. The engine of claim 1 wherein the rotor has cylindrical wall and wherein the thermoelectric plugs are inserted into openings in the cylindrical wall.

15. The engine of claim 14 wherein the thermoelectric plugs are inserted at an angle inclined with respect to a radial direction.

16. An engine comprising:
    means for generating a cyclical electromagnetic field;
    a rotating assembly having a plurality of thermoelectric plugs disposed within the cyclical electromagnetic field;
    means for applying heat to the thermoelectric plugs;
    wherein the thermoelectric plugs are oriented in the rotating assembly such that electrical charges mobilized by application of heat interact with the cyclical electromagnetic field to exert a torque on the rotating assembly;
    wherein the means for applying heat to the thermoelectric plugs applies heat to first and second ends of the thermoelectric plugs;
    wherein each of the thermoelectric plugs has a generally hourglass shape.

17. An engine comprising:
    means for generating a cyclical electromagnetic field;
    a rotating assembly having a plurality of thermoelectric plugs disposed within the cyclical electromagnetic field;
    means for applying heat to the thermoelectric plugs;
    wherein the thermoelectric plugs are oriented in the rotating assembly such that electrical charges mobilized by application of heat interact with the cyclical electromagnetic field to exert a torque on the rotating assembly;
    further comprising means for generating a cyclical magnetic field;
    wherein the means for generating a cyclical magnetic field comprises a plurality of permanent magnets mounted for rotary motion external to the rotating assembly.

18. The engine of claim 17 further comprising magnetic shielding disposed between the permanent magnets and the rotating assembly to localize the magnetic field.

* * * * *